(12) United States Patent
Hepburn

(10) Patent No.: US 11,576,528 B2
(45) Date of Patent: Feb. 14, 2023

(54) HERB GRINDER AND ROLLING PAPER APPARATUS

(71) Applicant: Robert Hepburn, Wiarton (CA)

(72) Inventor: Robert Hepburn, Wiarton (CA)

( * ) Notice: Subject to any disclaimer, the term of this patent is extended or adjusted under 35 U.S.C. 154(b) by 204 days.

(21) Appl. No.: 17/138,236

(22) Filed: Dec. 30, 2020

(65) Prior Publication Data
US 2022/0202245 A1 Jun. 30, 2022

(51) Int. Cl.
*A47J 42/32* (2006.01)
*A47J 42/40* (2006.01)

(52) U.S. Cl.
CPC .............. *A47J 42/32* (2013.01); *A47J 42/40* (2013.01)

(58) Field of Classification Search
CPC .............. A47J 42/32; A47J 42/40; A24C 5/10
See application file for complete search history.

(56) References Cited

U.S. PATENT DOCUMENTS

| | | | | |
|---|---|---|---|---|
| 1,156,720 A | * | 10/1915 | Stromeyer | A24F 23/04 383/66 |
| 1,182,449 A | * | 5/1916 | Booth | B65D 33/24 383/41 |
| 1,222,254 A | * | 4/1917 | Adams | B65D 85/1045 206/268 |
| 1,389,175 A | * | 8/1921 | Wright | A24F 23/02 383/86 |
| 4,886,161 A | * | 12/1989 | Keidar | B65D 85/1081 206/246 |
| 5,878,875 A | * | 3/1999 | Leong | B65D 85/109 206/86 |
| 8,882,010 B2 | * | 11/2014 | Scharf | A47J 43/25 241/95 |
| 10,952,566 B2 | * | 3/2021 | Guetta | A47J 43/25 |
| 2019/0174957 A1 | * | 6/2019 | Guetta | A24F 23/02 |
| 2019/0174958 A1 | * | 6/2019 | Guetta | A47J 42/34 |
| 2020/0113229 A1 | * | 4/2020 | Barry | A24F 17/00 |

* cited by examiner

Primary Examiner — Faye Francis
(74) Attorney, Agent, or Firm — Orin Del Vecchio

(57) ABSTRACT

An herb grinding and rolling apparatus configured to provide availability of all of the elements required to facilitate the grinding of herbs and dispensing into a paper for subsequent rolling and smoking. The present invention includes a body wherein the body is formed from a first section, a second section and a third section. The three sections are foldably coupled so as to move the body between a folded position and an unfolded position. The first section includes an herb grinding compartment having an interior volume and an herb grinding plate. The second section and third section are configured to receive, retain and dispense sheets of paper suitable for use in rolling ground herbs. The paper includes perforation seams at one end thereof to produce a desired shape for an end of a rolled paper. The herb grinding compartment includes a funnel formation in the sidewall thereof.

11 Claims, 4 Drawing Sheets

HERB GRINDER AND ROLLING PAPER APPARATUS

FIELD OF THE INVENTION

The present invention relates generally to smoking and smoke material preparation, more specifically but not by way of limitation, an apparatus that is configured to provide elements for a user to grind smoking materials such as but not limited to herbs and further facilitate the entire rolling process so a user can assemble a smokeable finished product.

BACKGROUND

Smoking has been part of human cultures for thousands of years. There are many types of materials that are grown, harvested and produced for smoking consumption such as but not limited to tobacco and various herbs. Smokers will typically utilize various devices to smoke the smoking material which can include but is not limited to pipes, cigarettes, and bongs. It is also very popular to roll cigarettes or similar shaped smoking elements especially when users are smoking items such as but not limited to natural herbs. Natural herbs are often ground to a finer consistency and then rolled in a paper element wherein the completed product can facilitate the smoking of the natural herb in a convenient manner.

One issue with preparing your own smoking implement is the accessibility to all of the desired tools that facilitate the preparation of a well made smoking implement. Typically the tools required can include but are not limited to grinders, funnels, rolling papers and paper holders. All of the aforementioned elements can be carried but when a user is not at their place of residence availability to all of the desired elements can be limited. Additionally, having to carry all of the desired elements to produce a finished smokeable product can be cumbersome and is often not performed due to the inconvenience.

It is intended within the scope of the present invention to provide an apparatus that provides all of the elements needed to create a smokeable product wherein the present invention is a single assembly that includes desired necessary elements.

SUMMARY OF THE INVENTION

It is the object of the present invention to provide an assembly that includes all elements required to produce a finished smokeable product such as a hand rolled cigarette wherein the present invention includes a body being manufactured from a foldable material.

Another object of the present invention is to provide an herb grinder and rolling apparatus that facilitates the grinding and rolling of materials such as but not limited to herbs wherein the body includes three sections that are integrally formed and foldable with respect to each other.

A further object of the present invention is to provide an assembly that includes all elements required to produce a finished smokeable product such as a hand rolled cigarette wherein the first section includes a herb grinder and integrated compartment for collection of ground herbs.

Still another object of the present invention is to provide an herb grinder and rolling apparatus that facilitates the grinding and rolling of materials such as but not limited to herbs wherein the second section of the body includes a rolling paper compartment having a pair of cover members.

An additional object of the present invention is to provide an assembly that includes all elements required to produce a finished smokeable product such as a hand rolled cigarette wherein the third section of the body includes a second rolling paper storage compartment and further having rolling papers secured therein.

Yet a further object of the present invention is to provide an herb grinder and rolling apparatus that facilitates the grinding and rolling of materials such as but not limited to herbs wherein the rolling papers of the present invention include three perforations proximate one end thereof.

Another object of the present invention is to provide an assembly that includes all elements required to produce a finished smokeable product such as a hand rolled cigarette wherein the body of the present invention is movable intermediate a first position and a second position.

An alternate object of the present invention is to provide an herb grinder and rolling apparatus that facilitates the grinding and rolling of materials such as but not limited to herbs wherein the herb grinding compartment includes sidewall formations that facilitate dispensing of herbs subsequent the grinding thereof.

An alternative objective of the present invention is to provide an assembly that includes all elements required to produce a finished smokeable product such as a hand rolled cigarette wherein the herb grinding compartment includes a herb grinding plate secured to the rear wall of the herb grinding compartment.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
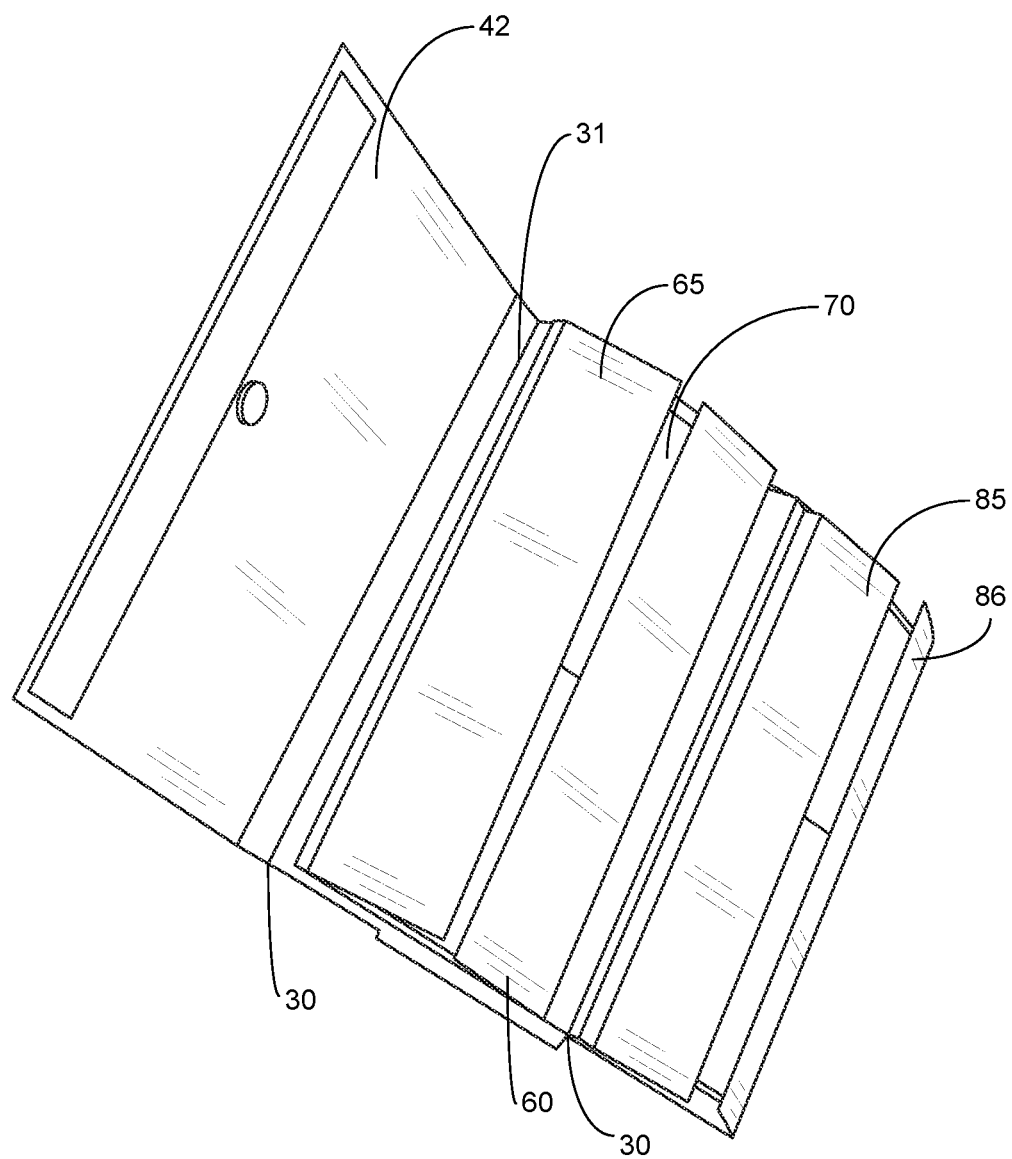
FIG. 1 is a perspective view of the body of the present invention in an un-folded position.
Figure 2:
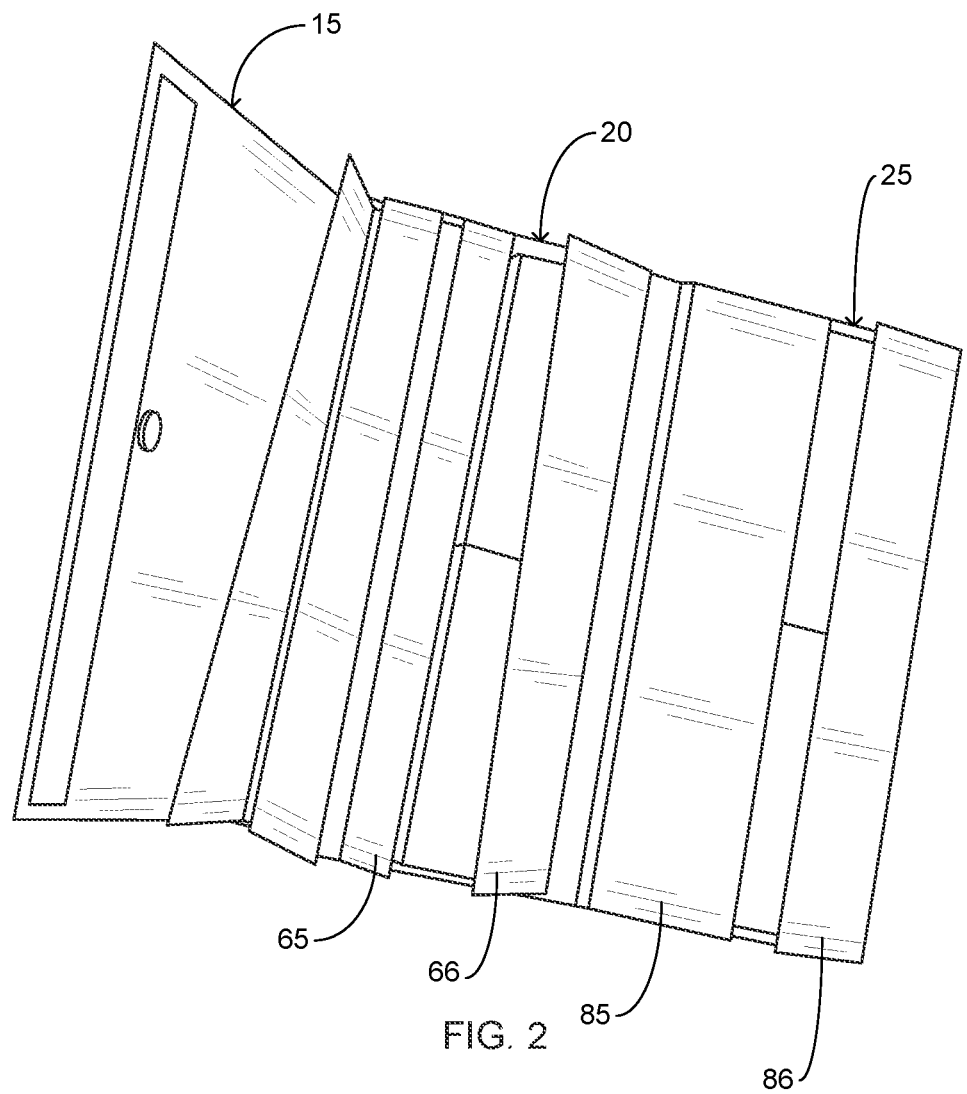
FIG. 2 is a front view of the present invention in its unfolded position.
Figure 3:
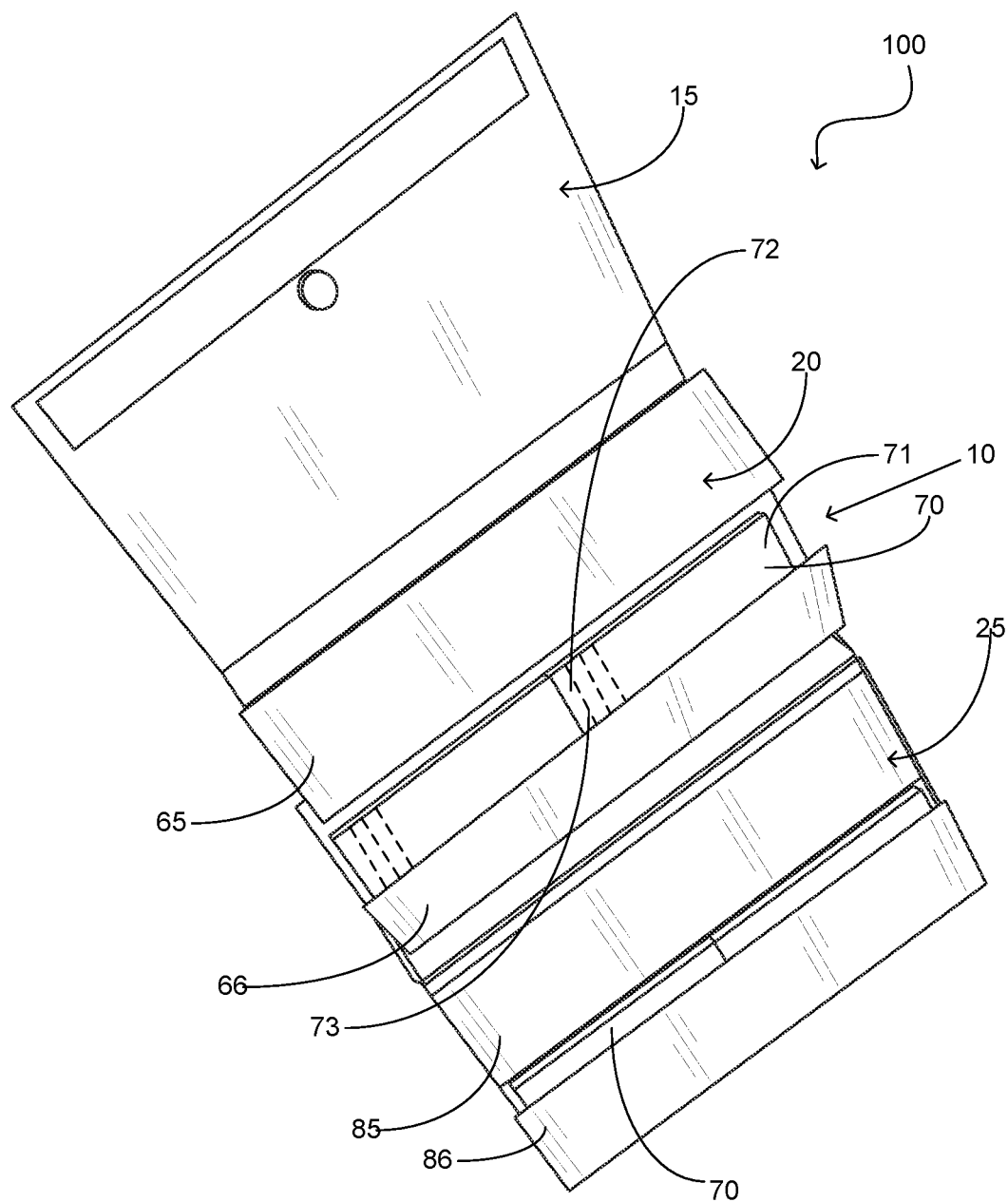
FIG. 3 is front perspective view of the present invention in its unfolded position with the cover members of the first paper compartment in a partially open position.

References now to the drawings submitted herewith, wherein various elements depicted therein are not necessarily drawn to scale and wherein through the views and figures like elements are referenced with identical reference numerals, there is illustrated a herb grinder and rolling apparatus 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Figure 4:
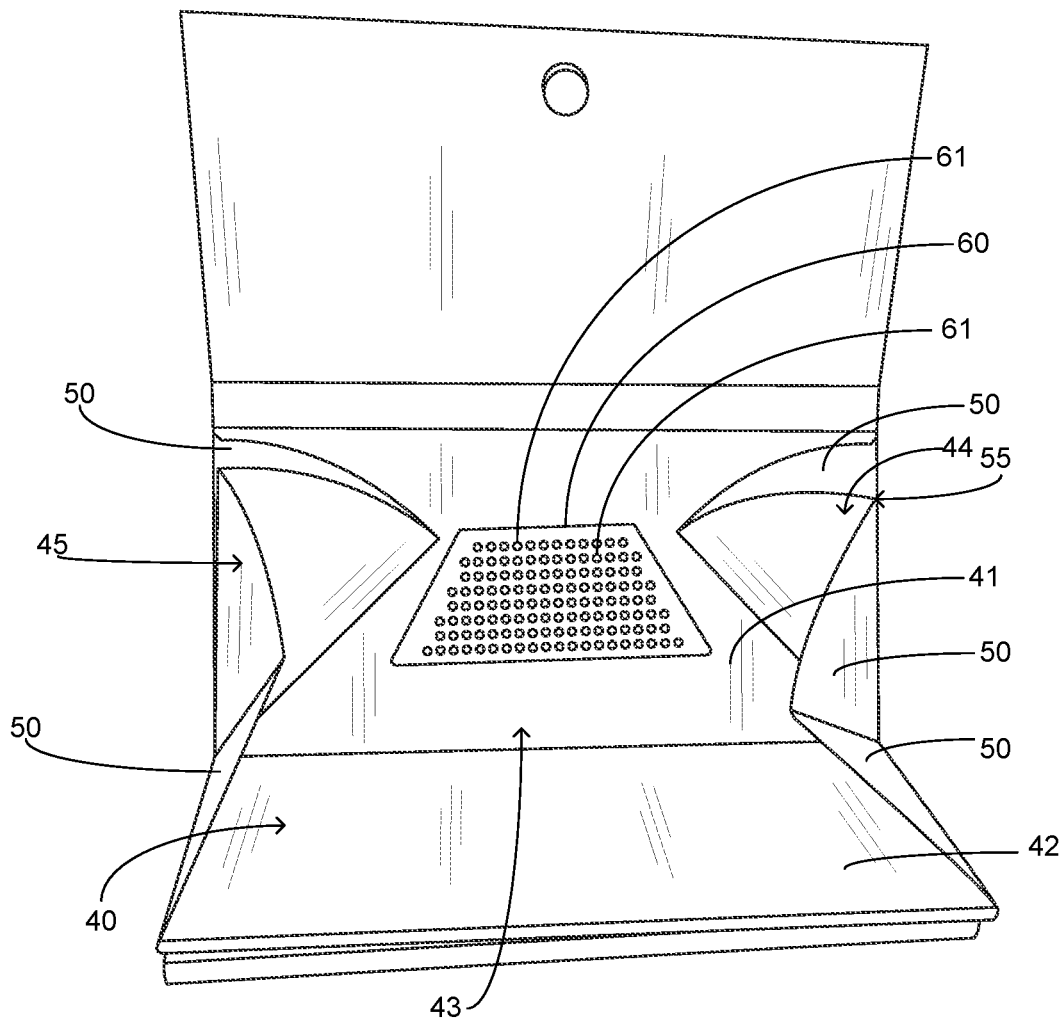
FIG. 4 is a detailed view of the herb grinding compartment of the present invention.

Now referring to the Drawings submitted as a part hereof, the herb grinder and rolling apparatus 100 includes a body 10 wherein the body 10 includes an integrally formed first section 15, second section 20 and third section 25. The body 10 is manufactured from a durable foldable material such as but not limited to cardboard and is foldable intermediate the first section 15, second section 20 and third section 25 along seams 30. The body 10 is configured to movable intermediate a first position and a second position wherein in the first position the third section 25 is folded over to be adjacent the second section 20 and the first section 15 is folded over the third section 25 providing a smaller more transportable size of the body 10. The body 10 is further foldable along upper seam 31 in order to provide an open position of the first section 15, which exposes the herb grinding compartment 40, particularly illustrated herein in FIG. 4. It should be understood within the scope of the present invention that the body 10 could be provided in alternate sizes and shapes.

The first section 15 of the body 10 includes a herb grinding compartment 40. The herb grinding compartment 40 is provided in order to facilitate the grinding and collection of herbs ensuing the grinding thereof. The herb grinding compartment 40 includes a rear wall 41 and a front wall 42 that are foldably coupled so as to provide an interior volume 43. The rear wall 41 and front wall 42 have formed therewith a first sidewall 44 and second sidewall 45. The first sidewall 44 and second sidewall 45 are formed on opposing ends of the herb grinding compartment 40. The first sidewall 44 and second sidewall 45 are formed from segments 50 that are contiguously formed having a plurality of folds 52 therebetween. The folds 52 intermediate the segments 50 provide the ability to move the herb grinding compartment 40 from a closed position to an open position. Furthermore, the segments 50 are arranged in order to produce a funnel formation 55 in the first sidewall 44. The funnel formation 55 facilitates the pouring of ground herbs from the herb grinding compartment 40 onto a rolling paper or into a desired container and/or smoking implement. It should be understood within the scope of the present invention that the first sidewall 44 and second sidewall 45 could be formed from an alternate quantity of segments 50 than illustrated herein. Additionally, it should be further understood that the first sidewall 44 and second sidewall 45 could each have a funnel formation 55.

The herb grinding compartment 40 further includes a herb grinding plate 60. The herb grinding plate 60 is planar in manner and is secured to the rear wall 41 utilizing suitable durable techniques. The herb grinding plate 60 includes a plurality of projections 61 that are raised wherein the raised projections 61 facilitate the grinding of an herb when pressed thereagainst by a user. It should be understood within the scope of the present invention that the herb grinding plate 60 could be provided in alternate shapes and sizes and still achieve the desired objective discussed herein. In the preferred embodiment the herb grinding plate 60 is manufactured from plastic.

Figure 5:
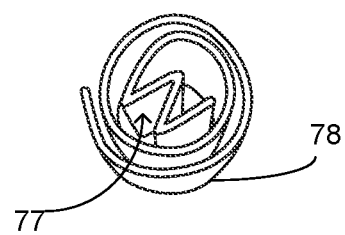
FIG. 5 is an end view of a rolling paper of the present invention in a rolled position.

The second section 20 of the body 10 is adjacent to and beneath the first section 15 when the body 10 is in an unfolded position. The second section 20 is provided to receive and store therein papers 70 wherein the papers 70 are suitable for rolling and smoking consumption. The second section 20 of the body 10 includes a first cover member 65 and a second cover member 66. The first cover member 65 and second cover member 66 are integrally formed with the second section 20 and are foldable so as to provide access to the papers 70. The papers 70 are secured underneath the first cover member 65 and second cover member 66 utilizing suitable durable techniques and are dispensed one at a time. The papers 70 are rectangular in shape having opposing ends 71,72. The papers 70 are removed by tearing a single sheet of paper 70 from the stack that is secured within the second section 20. The paper 70 is manufactured with three perforation seams 73 adjacent to end 72. The perforation seams 73 are provided in order to achieve the shape of the end 77 of the rolled paper 78 illustrated herein in particular in FIG. 5. The paper 70 is folded along the three perforation seams 73 in order to create the illustrated "W" shape of the end 77. The papers 70 are provided in adjacent stacks and are removable a single sheet at a time for use in rolling an herb that has been ground in the herb grinding compartment 40. While the second section 20 is illustrated herein having a first cover member 65 and second cover member 66, it is contemplated within the scope of the present invention that the second section 20 could have a single cover member configured to cover the stacks of paper 70.

The third section 25 of the body 10 is formed adjacent to the second section 20 and is configured to be foldable with respect thereto. The third section is identically formed as the second section 20 having first cover member 85 and second cover member 86 configured to superposed stacks of paper 70. The third section 25 provides additional storage of papers 70 in order to increase the utilization capacity of the herb grinder and rolling apparatus 100. It is contemplated within the scope of the present invention that the herb grinder and rolling apparatus 100 is a single use item and subsequent consumption of all of the papers 70 provided therewith the herb grinder and rolling apparatus 100 is disposed of properly. While it is intended within the scope of the present invention that the herb grinder and rolling apparatus 100 is disposable, it is contemplated within the scope of the present invention that the herb grinder and rolling apparatus 100 could be re-usable wherein the stacks of paper 70 could be replaced ensuing consumption thereof. It is further contemplated within the scope of the present invention that the second section 20 and third section 25 could have disposed therein alternate types of paper 70.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding description is, therefore, not intended to be limited to the specific forms set forth herein, but on the contrary, it is intended to cover such alternatives, modifications, and equivalents, as can be reasonably included within the spirit and scope of the invention.

What is claimed is:

1. An herb grinding and rolling apparatus comprising:
   a body, said body having a first section, a second section and a third section, said first section, second section and third section being contiguously formed, said first section, second section and third section being foldable with respect to each other;
   a herb grinding compartment, said herb grinding compartment being formed in said first section of said body, said herb grinding compartment having an interior volume suitable to accommodate ground herbs therein, said herb grinding compartment being movable between a closed position and an open position, said herb grinding compartment having an herb grinding plate disposed therein, said herb grinding plate configured to have herbs pressed thereagainst and facilitate the grinding thereof; and
   wherein said second section includes at least one cover member, said at least one cover member being configured to cover an interior portion of said second section, and
   wherein said second section includes a stack of papers, said stack of papers being rectangular in shape, said stack of papers having a plurality of paper having a first end and a second end, said plurality of paper each having three perforation seams proximate said first end.

2. The herb grinding and rolling apparatus recited in claim 1, wherein said herb grinding compartment includes a first sidewall and a second sidewall, said first sidewall and said second sidewall include a plurality of segments, said plurality of segments being foldable with respect to each other.

3. The herb grinding and rolling apparatus recited in claim 2, wherein said plurality of segments are foldable so as to create at least one funnel formation, said at least one funnel formation being operable to assist in the removal of ground herbs disposed within the herb grinding compartment.

4. The herb grinding and rolling apparatus recited in claim 1, wherein the three perforation seams are folded to create a W shape at the first end of the paper.

5. The herb grinding and rolling apparatus recited in claim 4, wherein said third section is adjacent to said second section distal to said first section, said third section being foldable with respect to said second section.

6. An apparatus configured to facilitate grinding of herbs, collection of the herbs and dispensing the herbs onto a paper element provided with the apparatus wherein the apparatus comprises:
   a body, said body having a first section, a second section and a third section, said first section, second section and third section being contiguously formed, said first section, second section and third section being foldable with respect to each other, said third section being adjacent to said second section when the apparatus is in a folded position, said first section being superposed said third section when the apparatus is in the folded position, said body being manufactured from cardboard;
   a herb grinding compartment, said herb grinding compartment being formed in said first section of said body, said herb grinding compartment having a rear wall, a front wall, a first sidewall and a second sidewall forming an interior volume, said interior volume of said herb grinding compartment suitable to accommodate ground herbs therein, said herb grinding compartment being movable between a closed position and an open position, said herb grinding compartment having an herb grinding plate secured to said rear wall, said herb grinding plate being manufactured from a rigid material and being configured to have herbs pressed thereagainst and facilitate the grinding thereof; and
   wherein said second section includes a first cover member and a second cover member, said first cover member and said second cover member being configured to cover an interior portion of said second section, said third section further having a first cover member and a second cover member, said first cover member and said second cover member of said third section configured to cover a stack of papers disposed within said third section.

7. The apparatus configured to facilitate grinding of herbs, collection of the herbs and dispensing the herbs as recited in claim 6, wherein said second section includes at least one stack of papers, said at least one stack of papers in said second section and said stack of papers in said third section include a plurality of sheets of paper wherein each of the plurality of sheets of paper include three perforation seams proximate one end of each of the plurality of sheets of paper.

8. The apparatus configured to facilitate grinding of herbs, collection of the herbs and dispensing the herbs as recited in claim 7, wherein the first sidewall and second sidewall of the herb grinding compartment are formed from a plurality of contiguous segments that are foldably coupled.

9. The apparatus configured to facilitate grinding of herbs, collection of the herbs and dispensing the herbs as recited in claim 8, wherein the contiguous segments of the first sidewall are operable to create a funnel formation when the herb grinding compartment is in its open position.

10. The apparatus configured to facilitate grinding of herbs, collection of the herbs and dispensing the herbs as recited in claim 9, wherein the herb grinding plate includes a plurality of projections formed thereon.

11. The apparatus configured to facilitate grinding of herbs, collection of the herbs and dispensing the herbs as recited in claim 10, wherein the body is manufactured from cardboard.

* * * * *